United States Patent [19]

Leitheiser et al.

[11] 4,077,931

[45] Mar. 7, 1978

[54] THERMOSET WATER-IN-OIL EMULSIONS

[75] Inventors: Robert H. Leitheiser, Port Washington, Wis.; Casimir C. Peloza, Columbus, Ohio

[73] Assignee: Ashland Oil, Inc., Dublin, Ohio

[21] Appl. No.: 600,558

[22] Filed: Jul. 31, 1975

Related U.S. Application Data

[63] Continuation of Ser. No. 323,267, Jan. 15, 1973, abandoned, which is a continuation-in-part of Ser. No. 96,986, Dec. 10, 1970, abandoned, and Ser. No. 762,320, Sep. 16, 1968, abandoned.

[51] Int. Cl.$^2$ ............................................. C08L 67/06
[52] U.S. Cl. ..................... 260/29.6 NR; 260/2.5 AN; 260/2.5 AV; 260/29.6 MM; 260/29.6 MN; 260/29.6 WQ; 260/863; 260/864
[58] Field of Search ............. 260/29.6 NR, 29.6 RW, 260/29.6 WQ, 861, 870, 863, 864, 29.6 MM

[56] References Cited

U.S. PATENT DOCUMENTS

| | | | |
|---|---|---|---|
| 3,255,127 | 6/1966 | von Bonin et al. | 260/2.5 |
| 3,256,219 | 6/1966 | Will | 260/2.5 |
| 3,442,842 | 5/1969 | von Bonin | 260/29.2 |
| 3,591,191 | 7/1971 | Coderre et al. | 260/29.6 NR |
| 3,629,169 | 12/1971 | Bedighian | 260/22 CB |
| 3,673,132 | 6/1972 | Parker et al. | 260/2.5 N |
| 3,687,883 | 8/1972 | Korf | 260/29.6 NR |
| 3,708,452 | 1/1973 | Tsubakimoto | 260/29.6 NR |
| 3,725,461 | 4/1973 | Jamison | 260/475 P |
| 3,726,819 | 4/1973 | Dijkhuizen | 260/22 CB |
| 3,734,867 | 5/1973 | Will | 260/2.5 R |
| 3,779,966 | 12/1973 | Weeks et al. | 260/29.6 NR |
| 3,806,563 | 4/1974 | Lammers | 260/29.6 WQ |

OTHER PUBLICATIONS

Niemczewski, Chemical Abstracts, 66:86,213u (1967).
Mikhailova, Chemical Abstracts, 65:13,875b (1966).
Mikhailova, Chemical Abstracts, 58:14,208d (1963).
Krolikowski et al., Chemical Abstracts, 66:56,088q (1967).
Mikhailova et al., Chemical Abstracts, 66:105,418h (1967).
Valgin et al., Chemical Abstracts, 69:78,089e (1968).

*Primary Examiner*—Walter C. Danison
*Attorney, Agent, or Firm*—Pollock, Vande Sande & Priddy

[57] ABSTRACT

Pumpable or pourable thermosetting water-in-oil emulsions comprising water as the continuous phase and a mixture containing an unsaturated polyester and copolymerizable solvent such as styrene as the continuous phase, wherein polyesters of a molecular weight of about 1800 or more and a peroxide-cobalt-tertiary amine curing system are employed.

33 Claims, No Drawings

THERMOSET WATER-IN-OIL EMULSIONS

CROSS-REFERENCE TO RELATED APPLICATIONS

This application is a continuation of prior copending application Ser. No. 323,267, filed Jan. 15, 1973 (now abandoned), which was a continuation-in-part of prior copending applications Ser. Nos. 96,986, filed Dec. 10, 1970 (now abandoned) and Ser. No. 762,320, filed Sept. 16, 1968 (now abandoned). The disclosures of Ser. No. 636,272, filed May 5, 1967 (now abandoned) and Ser. No. 592,687, filed Oct. 19, 1966 (now abandoned).

BACKGROUND

The work of Gunther Will, disclosed in U.S. Pat. No. 3,256,219, appears to represent the first successful attempt, coupled with an enabling disclosure, of the production of thermoset water-in-oil emulsions. Said patent and others disclose thermoset water-in-oil emulsions prepared with a variety of different oil phases, including those containing a mixture of an unsaturated polyester and a copolymerizable solvent. However, at the time the present invention was made, the art of producing polyester-containing thermoset water-in-oil emulsions was in a crude stage in its development. Widespread commercialization was hampered by the need for basic improvements not only in respect to such product characteristics as color and cell fineness, but also in respect to certain at least partially interrelated production characteristics such as emulsion stability, gel time, water exudation in the mold and cure shrinkage.

In accordance with the invention, it has been found that thermoset water-in-oil emulsions with superior properties and production characteristics result from the combined use of polyesters with molecular weights significantly above those of the average general purpose casting resins, and a particular promoter system. The polyesters used in accordance with this invention are obtained either by continuing the polyester producing polyesterification reaction for an extended period of time in order to increase the mean molecular weight to at least 1800, such as 1800 to 100,000, more preferably 2200 to 50,000, and most preferably 2800 to 30,000, or by terminating the polyesterification reaction when the polyester has reached a molecular weight such as 500 to 1800 and then modifying it with an amount of a coupling agent sufficient to increase the molecular weight to the desired value.

The mean molecular weight of the unmodified and modified polyesters useful in the present invention can be determined by conventional means such as solution viscosity, but is preferably determined by calculation from the reaction number, which is the sum of the acid value or acid number and the hydroxyl value, according to the following formula:

$$MW = 2(56,100)/RN$$

wherein:
MW = mean molecular weight
RN = reaction number

Thus, from the above formula, it can be seen that the preferred polyesters of the present invention will have reaction numbers less than 62.5, such as 1.1 to 62.5, more preferably 2.2 to 51.0, and most preferably 3.7 to 40.1.

As used herein "acid number" is the number of milligrams of potassium hydroxide necessary to neutralize the acidity of one gram of the non-volatile content of a sample. The "hydroxyl value" is the number of milligrams of potassium hydroxide necessary to neutralize the acidity released by the reaction product of one gram (non-volatile basis) of the polyester and acetic anhydride. As those skilled in the art will readily appreciate, the hydroxyl vaue indicated by the titration results should be corrected for the acid value the polyester had prior to reaction with the anhydride—to obtain a corrected hydroxyl value. It is this corrected value which is used in calculating reactivity number and molecular weight herein. The non-volatile content of the material is determined by placing a one-gram sample of the material in a small aluminum pan on a hotplate at 300° F for one-half hour at atmospheric pressure. When needed to prevent polymerization of the solvent, e.g. styrene, during the test, sufficient amounts of addition polymerization inhibitor(s) such as hydroquinone (see below) should be added to the sample prior to heating. The weight of the residue in grams multiplied by 100 equals the non-volatile content in percent.

The polyesters useful in the present invention are produced by reacting a polycarboxylic acid with a polyhydric alcohol at esterification temperatures, and generally between 150° and 250° C, until the acid value and the hydroxyl value of the reaction mixture have been reduced to values such that their sum equals the desired reaction number. These polyesters can be random polyesters produced by simultaneous addition of total quantities of all reactants or block polyesters produced by sequential addition of one or more reactants such as the saturated and unsaturated polycarboxylic acids.

Polycarboxylic acids which can be employed to produce the unsaturated polyesters useful in the present invention are both the saturated and unsaturated acids of 4 to 18 and preferably 5 to 8 carbon atoms. Examples of suitable saturated acids include, among others, oxalic acid, malonic acid, adipic acid, succinic acid, glutaric acid, sebacic acid, azelaic acid, as well as phthalic, isophthalic, and terephthalic acids which are preferred because they impart desirable physical characteristics such as compressive and tensile strength and impact resistance to the cured emulsion. Examples of suitable unsaturated acids include fumaric acid, itaconic acid, and maleic acid. Halogenated acids such as tetrachlorophthalic acid, tetrabromophthalic acid, and chlorendic acid (1, 4, 5, 6, 7,7-hexachloro-5-norbornene-2, 3-dicarboxylic) can also be employed. As used herein, the term "acid" is meant to include anhydrides, which are preferentially employed in order to minimize the water produced by the polyesterification reaction. Higher polycarboxylic acids such as trimellitic anhydride can be employed in amounts up to five weight percent which do not materially alter the linear nature of the polyester. However, in a preferred embodiment, the polycarboxylic acids consist essentially of dicarboxylic acids. The unsaturated acid is employed in an amount sufficient to provide the resultant polyester with ethylenic unsaturation capable of reacting with the copolymerizable solvent. Generally, the molar ratio of unsaturated acid to saturated acid is from 1:0 to 1:5.

The polyhydric alcohols which can be reacted with the polycarboxylic acids in order to give polyesters useful in the present invention are preferably the dihydric alcohols, examples of which include, among others, ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanediol, and 1,5-pentanediol. Persons skilled in the polyester resin art will readily observe that equivalent polyesters can be formed from "glycol anhydrides", e.g. alkylene oxides such as for example ethylene propylene and butylene oxides, and the term "polyhydric alcohols" should be interpreted in light of this fact. Higher polyhydric alcohols such as trimethylol propane and pentaerythritol can be used in minor amounts up to 5 weight percent which do not materially alter the linear nature of the polyester, but in a preferred embodiment the polyhydric alcohol consists essentially of dihydric alcohols.

The molar ratio of polycarboxylic acid to polyhydric alcohol is generally from 10:8 to 8:10, although stoichiometric ratios or those having up to 10 to 20 mole percent excess polyhydric alcohol can also be employed. When operating outside these ranges, it is frequently impossible to reduce the reaction number to the desired value within a reasonable period of time.

In one aspect of the present invention, the high molecular weight polyesters are produced by reacting a polyester having a molecular weight of 500 to 1800, and preferably 800 to 1500, with a polyfunctional, preferably a difunctional, coupling agent capable of reacting with hydroxyl and/or carboxylic acid groups on the polyester. Examples of suitable polyfunctional coupling agents include, among others, phosgene, polyacid halides, alkoxy melamine formaldehyde condensate compounds, polyepoxides, anhydrides of polybasic organic carboxylic acids, and the polyisocyanates, which are preferred.

Suitable polyisocyanates are cyclic or aliphatic polyisocyanates having from 2 to 5, preferably 2, isocyanate groups. Less preferably, isocyanate prepolymers formed by reacting excess polyisocyanate with with polyhydric alcohol can be employed. Examples of suitable polyisocyanates include, among others, the aliphatic polyisocyanates such as hexamethylene diisocyanate; alicyclic polyisocyanates such as 4,4'-dicyclohexylmethane diisocyanate; and aromatic polyisocyanates such as 2,4-and 2,6-toluene diisocyanate; diphenyl methane diisocyanate and the dimethyl derivative thereof, as well as 1,5-naphthalene diisocyanate; triphenyl methane triisocyanate; xylylene diisocyanate, and the methyl derivative; polymethylene polyphenyl isocyanate; chlorophenylene-2,4-diisocyanate, and mixtures thereof. Toluene diisocyanate is preferred because of its cost, availability, reactivity, and relatively low toxicity.

Examples of suitable polyepoxides include the diepoxide of cyclopentadiene and Epon 828 available from the Shell Oil Company.

Among the suitable polyacid halides, preferably diacid chlorides, are adipoyl chloride, phthaloyl chloride, and succinoyl chloride. When using these diacid halides, the coupling reaction produces a hydrogen halide such as HCl which should be inactivated because of the undesirably low pH of the resultant mixture. Excessively low pH's adversely affect emulsion stability, and the resulting need for inactivation makes the polyacid halides somewhat less preferred coupling agents. The hydrogen halides can be inactivated by physical removal such as subjecting the coupled resin to subatmospheric pressures and preferably those below 30 mm of Hg in a suitable apparatus such as an aspirator, or more preferably by neutralization with an organic or inorganic base. Examples of suitable inorganic bases include sodium hydroxide, potassium hydroxide, their corresponding oxides, and calcium carbonate which is preferred. The organic bases can be ammonia or the mono-, di- or tri-lower alkyl amines such as triethylamine, trimethylamine, triethanolamine, as well as pyridine and quinoline which are preferred because of the insolubility of their hydrochloride salts which facilitate their removal by filtration. Of course, a combination of 2 or more of the above methods can be employed to inactivate the hydrogen halide. When neutralizing the resin with a base, the base can be added directly to the resin either before or after addition of the diacid halide or, alternatively, the base can be added to the water with which the resin is to be emulsified.

The coupling is effected by simply mixing the polyester and the coupling agent at temperatures above that at which the reaction mixture solidifies and below that at which degradation of the reactants takes place, generally between 0° and 100° C. The completion of the coupling reaction can be determined by cessation of increase of molecular weight or viscosity, or by titration for unreacted coupling agent such as polyisocyanate. When the coupling agent is diisocyanate, the coupling reaction proceeds according to the following equation:

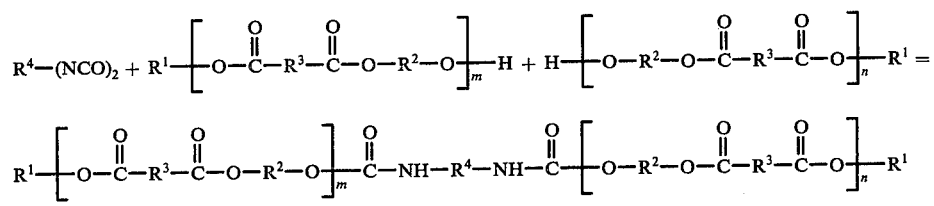

wherein $R^1$ is H— or HO—$R^2$—; $R^2$ is lower alkylene or alkoxy lower alkylene; $R^3$ is a divalent radical selected from the group consisting of phenylene, lower alkylene, and vinylene wherein at least a portion thereof is vinylene, m and n are integers equal to 1 to 8 inclusive; and $R^4$ is a phenylene or lower alkylene. The weight ratio of coupling agent to polyester is generally 1:100 to 50:100, and preferably 3:100 to 10:100.

Solvents which are useful in the present invention are those which are copolymerizable with the ethylenically unsaturated polyester, and which will dissolve the polyester, examples of which include vinyl toluene, alpha methyl styrene, acrylonitrile, ethyl acrylate, methyl acrylate, methyl methacrylate, vinyl acetate, triallylcyanurate, diallyl phthalate, methyl vinyl ether, ethyl vinyl ether, and styrene, which is preferred because of cost, availability and reactivity. The copolymerizable solvent is employed with the unsaturated polyesters in weight ratios of 10:1 to 1:10 and preferably 1:2 to 2:1.

In a preferred embodiment of the present invention wherein the mixture of polyester and copolymerizable solvent exhibits exceptional shelf life, the mixture contains an addition polymerization inhibitor. Addition polymerization inhibitors which can be used to inhibit addition polymerization during the reaction of the polyol and the polycarboxylic acid, or which can be used to inhibit polymerization of the stored composition comprising the uncured, curable linear polymer and the ethylenically unsaturated compound include, among others, hydroquinone, benzaldehyde, ascorbic acid, resorcinol, and symmetrical di (β-naphthyl)-p-phenylene diamine. These inhibitors can comprise up to 0.5 weight percent or more of the composition.

The present invention is based on the discovery that -- contrary to expectations based on manipulation of the prior art -- one can produce thermoset emulsions with a number of the above-mentioned desirable product and production characteristics when using, in a water-in-oil emulsion, a curing system composed of peroxide free radical generating catalyst, cobalt compound and tertiary aromatic amine, in conjunction with a polyester having a molecular weight in the range specified herein. As will be evident from the examples, which illustrate the invention, a solution is formed which includes the modified or umodified polyester, copolymerizable solvent and the cobalt compound. Prior to or during its formation this solution is mixed with water to form a water-in-oil emulsion. When completed, the emulsion also contains the tertiary aromatic amine promoter and peroxide catalyst. The cobalt compound in solution in the oil phase and the molecular weight characteristic of the polyester contribute jointly to the stability of the emulsion. The molecular weight also contributes with the tertiary aromatic amine to the rate at which the polymerizable water-in-oil emulsion will cure at a given level of peroxide catalyst and cobalt promoter.

The unique cooperation of these various factors was not apparent to leading workers in the relevant art. When Gunther Will disclosed the preparation of water-extended polyesters and other polymers in U.S. Pat. No. 3,256,219, he listed various "initiators and activators," including inorganic or organic cobalt salts and tertiary amines but directed his working examples to polyester having an acid number consistent with a lower molecular weight range than specified herein, cured without oil soluble cobalt salt. In view of the very substantially improved result provided by the present invention, he would have disclosed it had he recognized it. The fact that the invention was overlooked was perhaps a normal result of a technical prejudice among persons skilled in the polymer art due to their knowledge that water inhibits cobalt-promoted curing systems. Even those subsequent workers who presented working examples based on the use of cobalt compounds or tertiary amines in peroxide-catalyzed polymerizable water-in-oil emulsions (see U.S. Pat. No. 3,244,772) failed to grasp the discovery. They did not recognize that production characteristics and/or product properties could be improved when the above three-component curing system was used in conjunction with polyesters of specified molecular weight, whether the polyesters were modified or not. Thus, in order to provide desired emulsion stability and/or product characterists, certain of these workers turned to using polyesters with polyalkylene oxide tails, such as for instance as is disclosed in U.S. Pat. No. 3,442,842, apparently discarding the cobalt-peroxide curing systems.

In accordance with the invention, the oil phase is cured with the aid of a free-radical-forming peroxide catalyst. Any peroxide which is liquid or soluble in the emulsion and whose break-down into free radicals is promoted by cobalt is suitable, including for instance, hydrogen peroxide, methyl ethyl ketone peroxide, di-tert-butyl peroxide, tertbutyl hydroperoxide, isopropyl peroxidicarbonate, dichlorobenzoyl peroxide, lauroyl peroxide, acetyl peroxide, tert-butyl peracetate, tert-butyl perbenzoate, di-cumyl peroxide, di-ethyl peroxide, ditertamyl peroxide, and cyclohexyl hydroperoxide. The free radical-forming compound is employed in such concentration as is required to rapidly initiate the curing of the polyester and the vinyl monomer employed.

Suitable cobalt compounds which form solutions with the polyester and copolymerizable solvent include for instance cobalt naphthenate, cobalt octoate and their equivalents. Cobalt naphthenate and cobalt ocotoate are oil-soluble cobalt compounds which are known promoters for peroxide curing catalyst systems. The organic moieties of such cobalt compounds provide solubility in the polyester and solvent, but it is recognized in the art that the cobalt ion provides the reaction with the catalyst to promote release of free radicals for the reaction of a polyester and copolymerizable solvent. In this connection, see the SPI Handbook of Reinforced Plastics, Oleesky and Mohr, Reinhold, 1964, pp. 42–48. Thus, when this disclosure and the appended claims refer to cobalt octoate and/or cobalt naphthenate, such compounds will be understood to be representative of the entire class of organic cobalt compounds which will dissolve in the polyester and copolymerizable solvent, thus making cobalt ions available in the oil phase for promoting the curing thereof. Examples of other cobalt compounds falling within this class are cobalt neodecanate (which is preferred), cobalt linoleate, and cobalt salts of refined and unrefined organic acid mixtures.

Suitable tertiary amines include for instance dimethyl aniline (preferred) dimethyl paratoluidine and their equivalents. These compounds will be understood to be representative of the known class of tertiary aromatic amine promoters for peroxide curing catalyst systems. Other useful compounds in this class include, without limitation, N,n-diethyl aniline, phenyl diethanol amine, phenyl ethyl ethanol amine, N-ethyl-m-toluidine, meta toluidine and the like.

Guided by the examples of the invention given below, and their own general knowledge, persons of ordinary skill in the art of polyester-based thermosetting water-in-oil emulsions will readily select amounts of the peroxide catalyst, cobalt compound and tertiary aromatic amine which are sufficient for curing the emulsions. For instance, the concentration of peroxide catalyst needed is known to vary depending on the curing conditions and the particular polyester employed, but is generally within the range of 0.001 to 10 percent by weight based on the weight of the polymerizable solvent or vinyl monomer which is present. Generally, the optimum amount is considered to lie in the range of about 0.5 to about 2.5%.

The experimental evidence is such as to indicate that the cobalt and/or cobalt compound contributes appreciably to the stability of an emulsion in accordance with the invention, even where present in an amount which fails to cure the emulsion within the short cure times demanded by typical mass production casting processes. In experiments with the invention wherein low and progressively higher levels of cobalt were used, it was found that before significant promotion was obtained, a certain minimum level of cobalt had to be supplied. The portion of the cobalt supplied up to this minimum evidently is held by, or reacts, complexes, or otherwise cooperates with the polyester and/or the water in a way which significantly fosters stability in the emulsion, but does not appear to be available for promotion. That some reaction with the polyester is involved is suggested by the fact that this minimum level seems to vary with the acid value of the polyester. For example, for one polyester, WEP 11*, having a molecular weight of 3700 by the above reaction number formula, this minimum is approximately 0.3 parts of a 12% metal solution per 100 parts polyester and styrene, whereas for another polyester, WEP 27*, having a similarly determined molecular weight of 2800, this minimum is 0.5% (* - WEP 11 and WEP 27 are products of Ashland Oil, Inc.). Interestingly, amounts below these minima will, under typical circumstances, vigorously promote the cure of polyesters in non-aqueous systems; and those skilled in the art will readily note from the examples below that the invention employs substantially more cobalt than is employed in most circumstances with polyesters in non-aqueous systems. Such additional cobalt as is present above the minimum level is apparently available for the normal peroxide promotion reaction which is believed to involve alternate donation and acceptance of electrons as the cobalt repetively changes its valence state from $Co^{+2}$ to $Co^{+3}$ to $Co^{+2}$ and so forth. It should therefore be apparent that when one practices the invention with amounts of cobalt effective to promote curing, he will also have inherently supplied the quantity of cobalt required to procure the emulsion stabilization benefits discussed above. Optimum levels of cobalt (12% solution basis) are considered to lie in the range of about one to two percent for preferred polyesters of molecular weight in the range of about 2500 to about 4000.

Apparently, the cobalt which is present above and beyond the minimum level discussed above would be substantially inactivated in the absence of the tertiary amine. Available evidence suggests that water reacts more rapidly with $Co^{+3}$ than the peroxide, thus interrupting the cobalt in its function of helping break down the peroxide, unless the tertiary amine is present to stabilize the cobalt through complexation. Other things being equal, the optimum amount of tertiary aromatic amine promoter is generally considered by those skilled in the art to increase or decrease in accordance with increases or decreases in the number of cobalt ions available for complexation therewith. The relationship is not linear (perhaps due to a portion of the available cobalt ions having reacted with the acid groups of the polyester) but the optimum weight of for example dimethyl aniline will generally be about one third that of the cobalt (as shown by the examples) and will lie in the range of about 0.25 to about 1.25% for the preferred polyesters of a molecular weight of about 2500 to about 4000.

In any event, those skilled in the art are experienced in determining the optimum amounts of catalysts and promoters for a given set of curing conditions by simple experiments in which the invention is carried out repetitively under the given conditions with planned variations in the amounts and ratios of tertiary amine, cobalt compound and catalyst, while noting the gel time, gel to peak exotherm and peak exotherm of the curing reaction and observing the physical properties of the product. The results are then correlated in a known manner with the amounts used. Generally, the total amount of promoters will be an effective amount within the range of 0.1 to 5% by weight of the oil phase.

The emulsions of the present invention can be prepared by simply mixing the copolymerizable solvent and the modified or unmodified polyester with water by any suitable means such as an egg-beater or an air-driven stirrer, or by use of centrifugal pumps at weight ratios of 1:10 to 10:1 and preferably 1:4 to 2:1 of polyester and copolymerizable solvent to water. According to the various preferred methods, the various emulsion components, certain of them being premixed, are placed in various reservoirs. Each of the reservoirs is equipped with a pump at its outlet, and the outlet stream from each is metered into a mixing chamber (having a relatively high shear mixing means therein) wherein the streams are emulsified. The mixing chamber outlet is equipped with a delivery tube which can be directed towards a location where the emulsion is to be cured. In view of the fact that the preferred method of preparation discharges the emulsion through a delivery tube by a pumping action arising out of the operation of the aforesaid pumping means and/or mixing means, it is preferred that a pumpable (and most preferably a pourable) emulsion be formed. Those skilled in the art will appreciate that the pourability and pumpability of an emulsion of the present type are basically a function of emulsion viscosity, and that the latter depends mainly upon such factors as the ratios of oil phase to water phase, the ratio of solvent to polyester, the molecular weight of the polyester, water droplet size, the presence of various additives, temperature and the like. Within the context of stable emulsions, lower viscosities are obtained through the use of higher ratios of oil phase to water phase and solvent to polyester, lower molecular weight polyesters within the above-described ranges, and using the emulsions at higher temperatures. Reverse manipulation of these factors can be used to increase viscosity. According to the method of emulsion preparation which was formerly particularly preferred, the polyester, vinyl monomer solvent and catalyst are premixed to the desired levels and placed in a reservoir. In a second reservoir is placed water, and in a third reservoir is placed promoter. Each of the reservoirs is equipped with a pump at its outlet, and the outlet stream from each is metered into a mixing chamber (having a relatively high shear mixer) wherein the three streams are emulsified.

According to the presently preferred method of forming the emulsion, the polyester, vinyl monomer solvent, the cobalt compound promotor and the tertiary amine promoter are premixed to the desired levels and placed in a reservoir. In a second reservoir is placed water and water-soluble and -dispersable peroxide catalyst at the desired level. Each of the two reservoirs is equipped with a pump at its outlet, and the outlet stream for each is metered into a mixing apparatus such as is disclosed by Clocker in U.S. Pat. No. 3,679,182.

The natural flame retardancy of the water-containing thermoset emulsions of the present invention can be enhanced according to know procedures such as by the addition of antimony trioxide and/or the use of halogenated reagents such as the above-described chlorinated and brominated polycarboxylic acids.

The polymerized emulsions of the present invention find utility as materials of contruction, thermal insulation, and filters and have other uses as described in U.S. Pat. No. 3,256,219.

In the following examples, all parts are by weight unless the contrary is clearly indicated.

When preparation of an emulsion is attempted, the emulsifying technique includes holding the oil phase under vigorous agitation with a propellor mixer in a paper beaker, gradually adding the water phase as a fine stream at the vortex which is formed in the oil phase by the mixer, endeavoring to add aqueous phase only as fast as it disappears, and —as necessary— using a wooden paddle to help (or in the attempt to help) incorporate any slight localized excesses of water which appear at the surface of the resultant emulsion, dispersion or mixture around the periphery.

COMPARATIVE EXAMPLES

EXAMPLE A

A polyester was prepared according to Example 11 of U.S. Pat. No. 3,256,219. The following quantities of the following ingredients were combined as indicated.

| Item | Ingredient | Quantity (grams) |
|---|---|---|
| A | Maleic anhydride | 686 |
| B | Phthalic anhydride | 518 |
| C | Propylene glycol | 878 |
| D | Dibutyl tin oxide, cooking catalyst | 2 |
| E | 20% mono tert, butyl hydroquinone in methyl isobutyl ketone, inhibitor | 1.9 |
| F | Styrene 12T, to make | 34% |

The molar ration of A:B:C was 2:1:3.3. Items A through D were charged to a three-neck round bottom flask fitted with a thermometer, mechanical stirrer, reflux condenser and water separation trap. The flask and its contents were heated with agitation at reflux temperature until the acid value of the reaction mixture dropped to 40. The flask and its contents were then cooled to 70° C. and E and F were added. The reaction mixture containing polyester I and termed "Polyester Solution I" tested as follows:

| Acid Value (solids basis) | 40 |
|---|---|
| Hydroxyl No. (solids basis) | 46.8 |
| Nonvolatile content | 66% |

Polyester I had a molecular weight of 1295 calculated from its reaction number as follows:

$$MW = \frac{2(56,100)}{40 + 46.8} = 1295$$

EXPERIMENT A (i)

To 200 grams of Polyester Solution I were added 2 grams of BPO (benzoyl peroxide) dissolved in 12 grams of water styrene. Using the above emulsification technique, 200 grams of cold water (54° F) were slowly added to the polyester solution. A white viscous emulsion or dispersion having a viscosity of 1440 cps at 62° F was obtained. Initially, the material appeared to be a very coarse dispersion rather than an emulsion. Examination under the microscope disclosed that the system comprised transparent droplets, most having a diameter of about 4 microns, but some larger droplets. One gram of dimethyl aniline was added to 310 grams of the emulsion or dispersion, a yellow, fairly smooth emulsion thus being obtained. Gellation occurred at approximately 15 minutes with a gel to peak exotherm of approximately 7 and ½ minutes and a peak exotherm of 162° F. Water exuded from the casting during the cure. The resultant casting was grayish tan in color. Its upper half appeared to have a very coarse cell structure, suggesting that the emulsion was on the verge of breaking before gellation began. A sample of the uncatalyzed emulsion broke overnight.

EXPERIMENT A (ii)

To 436 grams of Polyester Solution I were added 6.6 grams (1.5%) of cobalt octoate (12% metal) and 2.2 grams dimethyl aniline (0.5%). With the aid of a mechanical agitator 435 grams of water at 77° F were slowly added to the oil phase to produce a yellowish dispersion with a viscosity of 1100 cps at 78° F. Examination under the microscope showed droplets of a transparent dispersion in which there were large droplets larger than 30 microns and small droplets smaller than two microns. The larger droplets could be seen to be coalescing slowly. After 30 minutes, visual examination with the naked eye disclosed formation of free water on the emulsion and the water droplets, although appearing more uniform, had grown in size so they were readily visible. After again mixing to redisperse water, 700 grams of the dispersion were treated under agitation with 1.8 grams of Lupersol DSW, a commercially available proprietary peroxide catalyst which is believed to be based on methyl ethyl ketone peroxide. On catalysis, the emulsion immediately began to separate. Stirring was stopped and there was almost complete separation within 15 minutes thereafter.

EXPERIMENT A (iii)

To 400 grams of Polyester Solution I were added 128 grams of styrene to increase the weight percentage of styrene in the solution to 50%. To 175 grams of 50% solution were added 2.65 grams (1.5%) cobalt octoate (12% metal) and 0.9 grams dimethyl aniline (0.5%). Very slowly, 175 grams of water at 77° F. were incorporated to produce a low viscosity (20 cps) dispersion at about 75° F. The dispersion rapidly separated after stirring was stopped, and there was complete water separation within 5 minutes. No catalyst was added.

EXPERIMENT A (iv)

Experiment A (iii) was repeated, except that 5.30 grams, (3%), cobalt octoate (12% metal) and 1.8 grams dimethyl aniline (1.0%) were used. A tan colored emulsion having a viscosity of 310 cps at 74° F resulted. Microscopic examination on a glass slide showed the emulsion was breaking. At 15 minutes after stopping of stirring, the uncatalyzed emulsion had considerable free water at the bottom. Stirring 0.7 grams of DSW into 270 grams of the emulsion redispersed the water to give an emulsion with a good appearance which gelled 4 minutes after catalyzation, had a GPE (gel to peak exotherm time) of 8.7 minutes and had a PE (peak exotherm temperature) of 183° F. However, the resultant casting had a coarse cell structure and was stained pink by the large quantity of cobalt that had been used.

EXPERIMENT A (v)

Experiment A (iii) was repeated, except that 7.95 grams (4.5%), cobalt octoate (12% metal) and 2.7 grams DMA (dimethyl aniline—1.5%) were used. A reddish white emulsion of 330 cps viscosity at 75° F was obtained, on whose surface water began to collect when agitation was stopped. Microscopic examination showed readily observable coalescing of water droplets to larger droplets. Addition of 0.5% DSW appeared to improved emulsion quality, giving a gel time of 33 seconds, a GPE of 4.9 minutes and a PE of 200° F. This time the product had a fine cell structure but, again, it was stained by the cobalt.

EXAMPLE B

A polyester was prepared by combining the following quantities of the following ingredients:

| Item | Ingredient | Quantity (grams) |
|---|---|---|
| A | Maleic anhydride | 686 |
| B | Phthalic anhydride | 518 |
| C | Propylene glycol | 898 |
| D | Dibutyl tin oxide | 2 |
| E | 20% MTBHQ in MIBK | .21 |
| F | Styrene 12T, to make: | 32.6% |

Items A through D were charged to a three-neck round bottom flask fitted with a thermometer, mechanical stirrer, reflex condenser and water separation trap. The flask and its contents were heated with agitation at reflux temperature until the acid value of the reaction mixture dropped to 44.5
The flask and its contents were then cooled to 70° C. and E and F were added.
The reaction mixture containing polyester II and termed "Polyester Solution II" tests are follows:

| Acid Value | 44.5 |
|---|---|
| Hydroxyl No. | 39.6 |
| Nonvolatile content | 67.4% |

Polyester II has a molecular weight of 1335 calculated from its reaction number as follows:

$$MW = \frac{2(56,100)}{44.5 + 39.6} = 1335$$

EXPERIMENT B (vi)

Using the above-described emulsification technique, and 1.5% cobalt octoate (12% metal), 0.5% DMA and 0.5% of the peroxide catalyst, an attempt was made to emulsify Polyester Solution II. No emulsion could be formed.

EXAMPLE C

A polyester was prepared from:

| Item | Ingredient | Quantity (grams) |
|---|---|---|
| A | Maleic Anhydride | 686 |
| B | Phthalic Anhydride | 518 |
| C | Propylene Glycol | 878 |
| D | Dibutyl Tin oxide | 2 |
| E | 20% MTBHQ in MIBK | 1.9 |
| F | Styrene 12T, to make | 35% |

The molar ratio of A:B:C is 2:1:3.3, and the cooking procedure is the same as described in Example A, except that it is terminated at the proper time to produce Polyester III and Polyester Solution III which tests as follows:

| Acid Value (solids basis) | 24.8 |
|---|---|
| Hydroxyl No. (solids basis) | 40.3 |
| Nonvolatile Content | 65% |

Polyester III has a molecular weight of 1720 calculated as follows from its reaction number:

$$MW = \frac{2(56,100)}{24.8 + 40.3} = 1720$$

EXPERIMENT C (vii)

Polyester Solution III is cut with additional styrene to a 50% styrene content. To 200 grams of the cut resin are added 2 grams of BPO, (benzoyl peroxide) dissolved in styrene. A white emulsion or dispersion with a viscosity of 280 cps at 60° F is obtained by stirred in 200 grams of water at 52° F. A yellow color was noted after addition of 1 gram (0.5%) DMA. There was no gellation after 20 minutes. The material gelled overnight, exuding an appreciable amount of water prior to or during gellation.

EXPERIMENT C (viii)

To 419 grams of the 35% Polyester Solution III were added 6.3 grams, (1.5%), cobalt octoate (12% metal) and 2.1 grams DMA (0.5%). When incorporating water at 77° F. with agitation at 2000 rpm, it was difficult to get and keep the last 50 – 100 ccs of water in suspension. The resultant viscous pale yellow dispersion had a viscosity of 3300 cps at 68° F. Microscopic examination showed a non-uniform emulsion of water droplets in the range of 1 – 4 microns and 12 – 25 microns. On addition of 0.5% DSW, the emulsion began to break, with 20% of the water (tinted pink) being separated and visible after five minutes. After more than one hour, no gellation had occurred.

EXPERIMENT C (ix)

To 200 grams of the 50% styrene cut resin solution of Experiment C (vii) are added 3.0 grams (1.5%) cobalt octoate (12% metal) and 1.0 grams DMA (0.5%). Addition of 200 grams of water at 77° F results in a pale yellow dispersion with a viscosity of 400 cps at 75° F. When 277 grams of the dispersion were catalyzed with 0.7 grams DSW, it did not gel within 20 minutes. On the third day following, it was noted that gellation had occurred after considerable separation of water.

EXPERIMENT C (x)

Experiment C (ix) was repeated except that 6.0 grams (3%) cobalt octoate (12% metal) and one gram DMA (0.5%) were used. Microscopic examination of the resultant pink emulsion having a viscosity of 440 cps at 76° F showed non-uniform water droplets, some larger than 20 microns and other 2 – 4 microns. Catalysis with 0.8 grams DSW resulted in gellation in 44 seconds, GPE of 2.8 minutes and a PE of 200° F. Although the composite appeared fairly good in other respects, it was stained pink by the cobalt.

EXAMPLE D

A polyester was prepared by combining the following ingredients as indicated.

| Item | Ingredient | Quantity (grams) |
|---|---|---|
| A | Maleic anhydride | 686 |
| B | Phthalic anhydride | 518 |
| C | Propylene glycol | 878 |
| D | Dibutyl Tin Oxide | 2 |
| E | 20% MTBHQ in MIBK | 1.9 |
| F | Styrene 12T, to make | 49.1% |

The molar ratio of A:B:C was 2:1:3.3. Items A through D were charged to a three-neck round bottom flask fitted with a thermometer, mechanical stirrer, reflex condenser and water separation trap. The flask and its contents were heated with agitation at reflux temperature until the acid value of the reaction mixture dropped to 11.4. The flask and its contents were then cooled to 70° C. and E and F were added. The reaction mixture containing Polyester IV and termed "Polyester Solution IV" tested as follows:

| | |
|---|---|
| Acid Value (solids basis) | 11.4 |
| Hydroxyl No. (solids basis) | 24.8 |
| Nonvolatile content | 50.9% |

Polyester IV had a molecular weight of 3100 calculated from its reaction number as follows:

$$MW = \frac{2(56,100)}{11.4 + 24.8} = 3100$$

EXPERIMENT B (x)

To 200 grams of Polyester Solution IV were added two grams of Benzoyl Peroxide dissolved in 12 grams of warm styrene. Incorporation of 200 grams of cold (54° F.) water produced a white viscous (1040 cps at 63° F.) dispersion or emulsion. This material, when examined under the microscope, was seen to be less uniform than that prepared in Experiment A (i), above, in that it had water droplets in substantial numbers in each of three different size ranges, large droplets of 20 - 30 microns, intermediate droplets of 8 - 12 microns and many small droplets of about 2 microns. When one gram of DMA was added to 326 grams of the material, the resultant stable yellow dispersion or emulsion gelled in 16 minutes, had a GPE of 16½ minutes and had a PE of 175° F. The resultant casting had a much better appearance than the one produced in Experiment A (i), but had a coarser cell structure than the one produced according to the invention in Experiment D (xii) below.

EXPERIMENT D (xii)

The preceding experiment was repeated, except using 6.0 grams, (1.5%), cobalt octoate (12% metal) and 2.0 grams DMA (0.5%) with 405 grams resin solution and 77° F. water. The water emulsified easily to give a creamy white emulsion with substantially uniform droplets of 2 - 2½ microns observed under the microscope and having a viscosity of 1800 cps at 70° F. No free water was visible. Catalysis with 0.5% DSW turned the emulsion green, with gellation in 77 seconds, GPE 5¼ minutes and a PE of 191° F. However, the composite was white and had a fine cell structure.

The results of the foregoing Examples and Experiments are summarized in Table A - D which follows:

TABLE A-D

| Exp. | AV | OH | Mol Wt. | STY | Co | DMA | Water Temp | Emul Temp | Emul Visc | Emul Color | Micron Size | Emul Stab | Color Cat Emul | Cat | Gel Min | GPE Min | PE °F | Composite |
|---|---|---|---|---|---|---|---|---|---|---|---|---|---|---|---|---|---|
| A(i) | 40.0 | 46.8 | 1295 | 34.0 | — | .67 | 54 | 62 | 1440 | White | ~4 | Fair | Yellow | BPO | ~13 | ~7½ | 162 | Gray Brown-Coarse |
| A(ii) | 40.0 | 46.8 | 1295 | 34.0 | 1.5 | .5 | 77 | 78 | 1100 | Yellow | >30+<2 | <18 hr | Broke | DSW | No gel | — | — | |
| A(iii) | 40.0 | 46.8 | 1295 | 50 | 1.5 | .5 | 77 | ~75 | 20 | Yellow | — | <5 min | — | — | — | — | — | |
| A(iv) | 40.0 | 46.8 | 1295 | 50 | 3.0 | 1.0 | 77 | 74 | 310 | Tan | Breaking lg. drops | Free H₂O 10 min | — | DSW | 4 | 8.7 | 183 | Pink - coarse |
| A(v) | 40.0 | 46.8 | 1295 | 50 | 4.5 | 1.5 | 77 | 75 | 330 | Red-Wht | lg. drops | Some H₂O | Pink | DSW | ½ | 4.9 | 200 | Pink - fine celled |
| B(vi) | 44.5 | 39.6 | 1335 | 32.6 | 1.5 | .5 | 75 | — | — | — | — | <10 min | | | | | | |
| C(vii) | 24.8 | 40.3 | 1720 | 50.0 | — | 0.5 | 52 | 60 | 280 | — | breaking | No Emul | | BPO | >20 | | | Gel overnight - exuded apprec. amt. of water Emul - 20% free water 5 min after cat addn. |
| C(viii) | 24.8 | 40.3 | 1720 | 35.0 | 1.5 | 0.5 | 77 | 68 | 3300 | Yellow | 10-2 +1-4 | | Yellow | DSW | No gel | | | Gel over weekend |
| C(ix) | 24.8 | 40.3 | 1720 | 50.0 | 1.5 | 0.5 | 77 | 75 | 400 | Yellow | >10 + <2 | | | DSW | >20 | | | |
| C(x) | 24.8 | 40.3 | 1720 | 50.0 | 3.0 | 0.5 | 77 | 76 | 440 | White | 20+2-4 20-30, | Stable | Yellow | DSW | ¾ | 7.8 | 200 | Pink - fairly good |
| E(xii) | 11.4 | 24.8 | 3100 | 49.1 | — | 0.67 | 52 | 63 | 1040 | | +8-12, +2 | | | BPO | 16 | 16½ | 175 | White - med. fine cells |
| E(xiii) | 11.4 | 24.8 | 3100 | 49.1 | 1.5 | 0.5 | 77 | 70 | 1800 | White | 2-2½ | Stable | Green | DSW | 1½ | 5¼ | 191 | White-fine celled |

The following examples further illustrate the invention:

EXAMPLE 1

This example illustrates the synthesis of a polyester, termed Polyester A, which can be reacted with a polyisocyanate according to the present invention.

The following quantities of the following ingredients are combined as indicated.

| Item | Ingredient | Quantity (grams) |
|------|------------|------------------|
| A | maleic anhydride | 98 |
| B | phthalic anhydride | 148 |
| C | propylene glycol | 160 |
| D | styrene (containing 150 ppm hydroquinone) | 130 |

The molar ratios of A:B is 1:1 and A+B:C is 1:1.05. Items A through C are charged to a three neck round bottom flask fitted with a thermometer, mechanical stirrer, reflux condenser and Dean-Stark water separation trap. The flask and its contents are heated with agitation at reflux temperature until the acid value of the reaction mixture drops to 27. The flask and its contents are then cooled to 70° C and D is added. The reaction mixture containing Polyester A and termed Polyester Solution A tests as follows:

| | |
|---|---|
| Acid Value | 27 |
| Hydroxyl Number | 60 |
| Viscosity | 3600 cps |
| Non-Volatile Content | 74% |

Polyester A has a molecular weight of 1290 calculated from its reaction number as follows:

$$MW = \frac{2(56,100)}{27 + 60} = 1290$$

This example illustrates the synthesis of a polyester, termed Polyester B, which can be reacted with a polyisocyanate according to the present invention.

The following quantities of the following ingredients are combined as indicated.

| Item | Ingredient | Quantity (grams) |
|------|------------|------------------|
| A | Maleic Anhydride | 124 |
| B | Isophthalic Acid | 488 |
| C | Diethylene Glycol | 524 |
| D | Styrene (containing 150 ppm hydroquinone) | 670 |

Items A through C are charged to a three neck round bottom flask fitted with a thermometer, mechanical stirrer, reflux condenser, and Dean-Stark water separation trap. The flask and its contents are heated with agitation at reflux temperature until the acid value of the reaction mixture drops to 9.9, whereupon the flask and its contents are cooled and the styrene and the reaction mixture containing Polyester B, termed Polyester Solution B, tests as follows:

| | |
|---|---|
| Acid Value | 9.9 |
| Hydroxyl Number | 49.2 |
| Viscosity | 470 cps |
| Non-Volatile Content | 50.0% |

EXAMPLE 3

This example illustrates the synthesis of a polyester, termed Polyester C, which can be reacted with a polyisocyanate according to the present invention.

The following quantities of the following ingredients are combined as indicated.

| Item | Ingredient | Quantity (grams) |
|------|------------|------------------|
| A | maleic anhydride | 142 |
| B | phthalic anhydride | 323 |
| C | diethylene glycol | 405 |
| D | toluene | 753 |
| E | acetone | 188 |

The molar ratio of A:B is 1:1.5. The molar ratio of A+B:C is 1:1.05.

Items A through C are charged to a three neck round bottom flask fitted with a thermometer, mechanical stirrer, reflux condenser and Dean-Stark water separation trap. The flask and its contents are heated with agitation at reflux temperature until the acid value of the reaction mixture drops to 30, whereupon the flask and its contents are cooled, items D and E added and the reaction mixture termed Polyester Solution C tests as follows:

| | |
|---|---|
| Acid Value | 30 |
| Hydroxyl Number | 50 |
| Viscosity | 42.5 cps |
| Non-Volatile Content | 46.2% |

EXAMPLE 4

This example illustrates the synthesis of a halogen-containing high molecular weight polyester termed Polyester D which can be employed in the present invention.

The following quantities of the following ingredients are combined as indicated:

| Item | Ingredient | Quantity (grams) |
|------|------------|------------------|
| A | maleic anhydride | 98 |
| B | tetrachlorophthalic anhydride | 286 |
| C | ethylene glycol | 65 |
| D | diethylene glycol | 111 |
| E | styrene (containing 150 ppm hydroquinone) | 520 |

The molar ratio of A:B is 1:1 and the molar ratio of A+B:C+D is 1:1.05. Items A through D are charged to a three neck round bottom flask fitted with a thermometer, mechanical stirrer, reflux condenser, and Dean-Stark water separation trap. The flask and its contents are heated with agitation at reflux temperature until the acid value of the reaction mixture drops to 12, whereupon the flask and its contents are cooled, and Item E is added. The reaction mixture containing Polyester D, termed Polyester Solution D, exhibits a hydroxyl value of 28 and has a non-volatile content of 50%.

EXAMPLE 5

This example illustrates the synthesis of polyisocyanate modified polyesters and demonstrates the stability of emulsions thereof.

Polyester Solution A (1600 g) is mixed with styrene (1340 g) and the resultant mixture is divided into a number of 400 g samples each containing 160 g of Polyester A and 240 g of styrene. Referring to Table I, these samples are employed in Runs 1 through 6 wherein they are admixed with the quantity of toluene diisocyanate (TDI) shown in Column 4 and the quantity of dibutyl tin dilaurate shown in Column 5. Immediately upon mixing the viscosity is measured and recorded in Column 6. The viscosity is measured again after 18 hours and recorded in Column 7. The increase in viscosity demonstrates the increase of molecular weight of Runs 2 through 6 inclusive.

In Run 1, the indicated quantities of Polyester A, styrene, and dibutyl tin dilaurate are admixed, promoted with 1.5% cobalt octoate (12% metal) and 0.5% dimethylaniline, and then emulsified with the indicated quantity of water. This emulsion separates completely upon addition of 0.5% of Peroxide A in 2 minutes into two phases and does not gel.

A quantity (100 g) of the styrene - TDI modified polyester mixture of Runs 2 and 5, to which has been added 1.5 g of cobalt octoate (12% metal) and 0.5 g of dimethylaniline is emulsified with the quantity of water shown in Column 8. Then Peroxide A (0.5 g), which is a mixture of 3 parts by weight of $H_2O_2$ and 1 part by weight of methyl ethyl ketone peroxide sold as "Lupersol DSW", was then mixed into the emulsion. A quantity of this emulsion is immediately poured into a rubber statuary mold and permitted to sit for 15 minutes after which the mold is removed, the emulsion observed, and the results recorded in Column 9.

stirred for one hour, whereupon stirring is stopped and the mixture left at rest for 45 minutes to permit escape of entrained air bubbles. The viscosity is now 630 cps. To a quantity of this reaction mixture (119 g) is added styrene (60 g), cobalt octoate (2.7 g, 12% metal solution) and dimethylaniline (0.9 g) with mixing to form a solution. To this solution is added water (270 g) with violent agitation to form an emulsion having water as the discontinuous phase. Peroxide A (0.9 g) is then added, whereupon the emulsion turns a pale green color. The emulsion gels in 3 minutes and cures in 15 minutes without exuding water and without shrinking to produce a satisfactory casting. This casting has an ivory to light tan color.

The above procedure is repeated employing the same ingredients, times, and conditions, except that the toluene diisocyanate is omitted. Upon peroxide addition, the emulsion turns dark green. The emulsion gels in 4 minutes, but shrinks and exudes water, indicating the instability of the emulsion produced from unmodified Polyester B.

EXAMPLE 8

This example illustrates the improved emulsion characteristics of an isocyanate-modified polyester, which polyester, without modification, requires reaction to a lower acid and hydroxyl number in order to exhibit satisfactory emulsion characteristics.

A sample (100 g) from Run 1 of Example 10, which is Run 6 of Table II, is admixed with styrene (100 g) to

TABLE I

| 1. RUN No. | 2. POLYESTER A (g) | 3. STYRENE (g) | 4. TDI (g) | 5. DBTDL (drops) | 6. Upon Mixing (cps) | 7. 18 Hrs. After Mixing (cps) | 8. WATER (g) | 9. DESCRIPTION OF EMULSION |
|---|---|---|---|---|---|---|---|---|
| 1 | 160 | 240 | 0 | 10 | 22.5 | 22.5 | 150 | Separates 1 |
| 2 | 160 | 240 | 6.2 | 10 | 22.5 | 89.5 | 150 | Poor emulsion 2 |
| 3 | 160 | 240 | 9.6 | 10 | 22.5 | 118.5 | | |
| 4 | 160 | 240 | 15.9 | 10 | 22.5 | 123 | | |
| 5 | 160 | 240 | 18.2 | 10 | 22.5 | 133 | 150 | Fair emulsion 3 |
| 6 | 160 | 240 | 21.8 | 10 | 22.5 | 101 | | |

NOTES:
1. Emulsion separates into two phases and does not gel.
2. The poor emulsion from this run gels in approximately 2 minutes to produce a coarse celled thermoset emulsion having cell sizes generally greater than about 5-10 microns in diameter.
3. The fair emulsion from this run gels in approximately 2 minutes to produce a thermoset emulsion having cell sizes generally greater than about 2-5 microns in diameter.

EXAMPLE 6

This example illustrates the present invention with use of a diepoxide as the coupling agent.

The procedure of Example 5 is repeated employing the same times, conditions, and reactants, except that the toluene diisocyanate is replaced by an equimolar amount of 1,4-butylene diepoxide, and $BF_3$ heterate is used as a catalyst.

EXAMPLE 7

This example illustrates the isocyanate modification of Polyester B and compares properties of emulsions from isocyanate-modified Polyester B and unmodified Polyester B.

Polyester Solution B (1670 g), toluene diisocyanate (35 g), and dibutyl tin dilaurate (10 drops) are intimately mixed by stirring for five minutes whereupon the viscosity of the mixture is 365 cps. An additional amount of dibutyl tin dilaurate (10 drops) is added and the mixture give a polyester solution of 50 weight percent styrene termed Polyester Solution E. Polyester Solution E (200 g) is promoted with 1.25% cobalt octoate (12% metal) and 0.5% DMA, whereupon water (300 g) is then added to the contents of the beaker by stirring with an air-driven stirrer. A poor emulsion results which separates into two phases in less than 10 minutes.

A sample of polyester solution (870 g) is prepared from 470 grams toluene and 400 grams of the polyester from Run 1 of Example 10. This solution is charged to a three neck flask equipped with a stirrer, thermometer, condenser, and Dean-Stark water separation trap. The stirrer is turned on and heat is applied to the flask. Distillate (220 g) is removed to azeotropically dry the polyester and the flask and its contents cooled to 50° C, whereupon toluene diisocyanate (24.8 g) is added. The flask and its contents are slowly heated to 110° C, whereupon toluene begins to distill. As the remaining toluene is distilled off, the temperature rises to 175° C, whereupon heat is removed and vacuum applied. When the flask and its contents have cooled to 65° C, a solution (14 drops) of 20 weight percent monotertiary butyl hydroquinone is added. Styrene (425 g) is admixed with the above-described polyester-isocyanate reaction product and this reaction product has a viscosity of 95.5 cps at 50% resin solids, an acid value of 24.0, a hydroxyl number of 29.0 and a reaction number of 53. A portion of this resin (113 g) is promoted with 1.65 g of cobalt octoate (12% metal) and 0.55 g of dimethylaniline and then emulsified with 168 g of water. The emulsion, which is stable for more than 10 minutes, gels in 3½ minutes after adding Peroxide A (0.5 g) without exuding water to give a hard composite.

Similar treatment of 778 grams of the starting polyester solution used in the preceding paragraph with phenylmono isocyanate (30.5 g) gives a final resin viscosity of 38.5 cps at 50% resin solution. The final acid value is 24.5, the hydroxyl number is 27.0 and the reaction number is 51.5. A portion of this resin (150 g) is promoted with 2.25 g of cobalt octoate (12% metal) and 0.75 g of dimethylaniline. An attempt to form an emulsion with 225 g of water failed. Initial addition of 100 g of water gives a fair emulsion, but on further addition of water, the emulsion rapidly separates into 2 phases when stirring is stopped.

EXAMPLE 9

This example illustrates the increased stability of an emulsion of the present invention with increased polyester molecular weight. Data from this example are recorded in Table II as Runs 1 through 5.

The following quantities of the following ingredients are combined as indicated:

| Item | Ingredient | Quantity (grams) |
|------|-----------|------------------|
| A | Maleic Anhydride | 98 |
| B | Phthalic Anhydride | 222 |
| C | Diethylene Glycol | 278 |

Items A through C are charged to a three neck round bottom flask fitted with a thermometer, mechanical stirrer, reflux condenser, and Dean-Stark water separation trap. The flask and its contents are heated with agitation at reflux temperature until the acid value of the reaction mixture drops to that shown in Column 2 of Table II, whereupon one or more 100 g samples are removed and cooled to room temperature. The hydroxyl number of each sample is measured and recorded in Column 4. Each sample is mixed with the weight of styrene shown in Column 5 and then promoted with 1.5% cobalt octoate (12% metal) and 0.5% dimethylaniline to give 250 grams of solution. To this solution in a beaker is added with vigorous stirring the amount of water shown in Column 7. The emulsion characteristics of each sample are measured by the ability to emulsify the solution with an air-driven stirrer, and the observations are recorded in Column 9 according to the following legend.

1. Unstable Emulsion - emulsion forms but separates in less than ten minutes.

2. Poor Emulsion - emulsion does not separate; however, water forms on top of the emulsion and the emulsion cures with further exudation of water to give a composite with visible cell structure (>10 microns).

3. Fair Emulsion - emulsion appears stable but exudes a small amount of water during cure resulting in excessive shrinkage (>1.5%)

4. Good Emulsion - emulsion cures without exuding water and exhibits minimal shrinkage during cure (<1.5%).

The shrinkage is determined by measuring the transverse inside dimension of the mold in which the emulsion cures and then measuring the corresponding outside dimension of the molding. The difference divided by the inside dimension of the mold, times 100, is the percent shrinkage recorded in Column 10 of Table II.

EXAMPLE 10

The procedure of Example 9 is repeated employing the same times, conditions, and reactants, except that a smaller excess of glycol is employed so that the reaction number can be reduced to a value of less than 60 without cooking to excessively low acid values. Samples are periodically removed until an acid value of 16.8 is reached, whereupon the reaction mixture is cooled, tested as described in Example 9, and the results recorded in Table II as Runs 6 through 9.

TABLE II

| 1. RUN No. | 2. ACID NO. (mg KOH) | 3. HYDROXYL NO. (mg KOH) | 4. REACTION NO. (Col 2 + Col 3) (mg KOH) | STYRENE 5. Weight per 100 g of resin (g) | STYRENE 6. % based on combined weight of styrene & polyester % | WATER 7. Weight (g) | WATER 8. % based on combined weight of styrene, polyester & water % | 9. EMULSION CHAR. | 10. SHRINKAGE % |
|---|---|---|---|---|---|---|---|---|---|
| 1 | 27.3 | 76.2 | 103.5 | 150 | 60 | 375 | 60 | Unstable | |
| 2 | 26.4 | 75.7 | 102.1 | 150 | 60 | 375 | 60 | Unstable | |
| 3 | 15.8 | 62.5 | 78.3 | 150 | 60 | 375 | 60 | Poor | |
| 4 | 11.6 | 59.1 | 70.7 | 150 | 60 | 375 | 60 | Fair | >1.5 |
| 5 | 8.0 | 55.0 | 63.0 | 150 | 60 | 375 | 60 | Fair | >1.5 |
| 6 | 31.8 | 55.0 | 86.8 | 150 | 60 | 375 | 60 | Unstable | |
| 7 | 26.8 | 48.0 | 74.8 | 150 | 60 | 375 | 60 | Unstable | |
| 8 | 24.9 | 43.0 | 67.9 | 150 | 60 | 375 | 60 | Fair | ≦1.5 |
| 9 | 16.8 | 28.0 | 44.8 | 150 | 60 | 375 | 60 | Good | <1.5 |

EXAMPLE 11

This example illustrates the increased stability of emulsion of the present invention with increased polyester molecular weight. The data from this example are recorded in Table III as Runs 1 through 6.

The following quantities of the following ingredients are combined as indicated:

| Item | Ingredient | Quantity (grams) |
|------|------------|------------------|
| A | maleic anhydride | 98 |
| B | phthalic anhydride | 222 |
| C | diethylene glycol | 284 |

The molar ratio of A:B is 1:1.5 and the molar ratio of A+B:C is 1:1.07.

Items A through C are charged to a three neck round bottom flask fitted with a thermometer, mechanical stirrer, reflux condenser and Dean-Stark water separation trap. The flask and its contents are heated with agitation at reflux temperature until the acid value of the reaction mixture drops to that shown in Column 2 of Table III whereupon one or more 100 g samples are removed and cooled to room temperature. The hydroxyl number of each sample is measured and recorded in Column 3, the reaction number calculated and recorded in Column 4. Each sample is mixed with the weight of styrene shown in Column 5 to give a solution and the amount of water shown in Column 7 is added to the resin solution after promotion with 1.25% cobalt octoate (12% metal) and 0.5% dimethylaniline.

EXAMPLE 12

This example illustrates the increased stability of emulsions of the present invention with increased molecular weight wherein a reduced amount of polyol is employed. The data from this example are recorded in Table III as Runs 7 through 9.

The procedure of Example 11 is repeated employing the same times, conditions and reactants except that the amount of diethylene glycol is reduced to 273 g giving a molar ratio of A+B:C of 1:1.03. The polyesters and emulsions thereof are evaluated as described in Example 10 and the results recorded in Table III as Runs 6 through 9.

| G-H Impact | 8 |
|---|---|
| Flexural Strength | 2,900 psi |
| Flex Modulus | 102,341 |
| Tensile Strength | 1,447 psi |
| Tensile Modulus | 105,834 |
| Tensile Elongation | 1.7 |
| Compressive Strength | 3,353 psi |
| Compressive Modulus | 77,600 |

EXAMPLE 14

This control example illustrates by comparison the less stable emulsions produced by use of polyester of lower molecular weight than those of Example 13.

The procedure of Example 13 is repeated employing the same times, conditions, and ingredients except that the three neck flask containing the polyester reaction mixture is cooled as soon as the acid value has dropped to 30. The hydroxyl value is 45, and the non-volatile content is 50%. The emulsion begins to separate after 10 minutes.

EXAMPLE 15

This example illustrates the practice of the present invention employing a diacid halide as the coupling agent.

The following quantities of the following ingredients are combined as indicated:

| Item | Ingredient | Quantity (grams) |
|------|-----------|------------------|
| A | Polyester A at 50% N.V. in styrene | 600 |
| B | Pyridine | 20 |
| C | Adipoyl choride | 24 |
| D | Peroxide A | 1.5 |
| E | Dimethylaniline | 0.5 |

Item B is added to Item A, whereupon Item C is

TABLE III

| 1. RUN No. | 2. ACID NO. (mg KOH) | 3. HY-DROXYL NO. (mg KOH) | 4. REACTION NO. (Col 2 + Col 3) (Mg KOH) | 5. Weight per 100g of resin (g) | 6. STYRENE % based on combined weight of Styrene & polyester % | 7. WATER Weight (g) | 8. % based on combined weight of styrene, polyester & water % | 9. EMULSION CHAR. per Example 9 | 10. SHRINKAGE per Example 9 % |
|---|---|---|---|---|---|---|---|---|---|
| 1 | 23.4 | 55.2 | 78.6 | 100 | 50 | 300 | 60 | poor | >1.5 |
| 2 | 17.6 | 50.3 | 67.9 | 100 | 50 | 300 | 60 | fair | >1.5 |
| 3 | 13.8 | 47.4 | 61.2 | 100 | 50 | 300 | 60 | fair | >1.5 |
| 4 | 10.2 | 47.3 | 57.5 | 100 | 50 | 300 | 60 | good | <1.5 |
| 5 | 10.2 | 47.3 | 57.5 | 150 | 60 | 375 | 60 | poor | >1.5 |
| 6 | 10.2 | 47.3 | 57.5 | 224 | 70 | 486 | 60 | unstable | |
| 7 | 8.7 | 25.8 | 34.5 | 100 | 50 | 300 | 60 | good | <1.5 |
| 8 | 8.7 | 25.8 | 34.5 | 150 | 60 | 375 | 60 | good | <1.5 |
| 9 | 8.7 | 25.8 | 34.5 | 224 | 70 | 486 | 60 | good | <1.5 |

EXAMPLE 13

This example illustrates the emulsions stability and physical characteristics of a cured emulsion wherein the polyester is produced from a halogenated acid.

Polyester Solution D (300 g) is promoted with 4.5 g of cobalt octoate (12% metal) and 1.5 g of dimethylaniline, and this solution is emulsified with water (300 g), catalyzed with 1.5 grams of peroxide and placed in a mold. The emulsion cures without phase separation and without exuding water to give a casting having the following characteristics:

added with stirring and cooling to form a mixture. The temperature of the mixture increases due to exothermic heat of reaction. Stirring is continued for 7½ hours to cool the mixture to room temperature, whereupon the mixture is filtered to give a filtrate having a viscosity of 100 cps. A portion of this filtrate (100 g) is promoted with 1.5 g of cobalt octoate (12% metal) and 0.5 grams of DMA and water (100 g) is added with rapid stirring with an air-driven stirrer to form a fairly stable emulsion curing in 5 minutes. Some water exudes during curing.

EXAMPLE 16

This example illustrates the process of the present invention employing a diacid halide as the coupling agent and sodium hydroxide as the neutralizing agent.

The following quantities of the following ingredients are combined as indicated:

| Item | Ingredient | Quantity (grams) |
|------|-----------|------------------|
| A | Polyester A at 50% N. V. in Styrene | 250 |
| B | Adipoly chloride | 12.5 |
| C | Sodium hydroxide | 0.5 |
| D | Cobalt octoate solution (12% wt. cobalt) | 3.7 |
| E | Dimethylaniline | 1.25 |

Item B is added to a flask containing Item A. The flask is stoppered and shaken and permitted to sit overnight, whereupon the viscosity of the mixture is found to be 80 cps. The mixture evidences a strong odor of hydrochloric acid and fumes when placed near a beaker of pyridine. Items C and D are then added with stirring. Water (250 g) is then added with stirring to produce a good emulsion which cures rapidly within one minute after adding 1.25 g of peroxide catalyst to a pale green composite.

EXAMPLE 17

The procedure of Example 16 is repeated except that the resin (200 g) is evacuated by means of a water aspirator for 30 minutes, promoted with 3.0 g of cobalt octoate (12% metal) and 1.0 g of DMA and an emulsion is formed with 0.3 weight percent aqueous sodium hydroxide solution (200 g). An emulsion having excellent stability results which cures rapidly on catalysis with 1.0 grams of peroxide to a pale green composite without exudation of water.

EXAMPLE 18

This example illustrates the practice of the present invention employing phosgene as the coupling agent.

Polyester Solution A is admixed with additional styrene until the non-volatile content has been reduced to 40% giving a solution having a viscosity of 22.5 cps. This solution is then placed in a closed flask fitted with an outlet tube directed to a safe area and a vapor inlet tube extending below the surface of the solution in the flask. Phosgene is passed through the inlet tube and bubbled through the solution with stirring until its viscosity has increased to 133 cps, whereupon the resultant solution (100 g) is degassed with a water aspirator and then 2.0 g of cobalt octoate (12% metal) and 1.9 g of DMA is added. The mixture is then emulsified with 100 g of water and Peroxide A (1.0 g) is added with stirring. The emulsion then rapidly cures to form a satisfactory thermoset composite.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A method for producing shapeable water-in-resin composition which is polymerizable to a thermoset cellular solid product which comprises forming a pumpable water-in-oil emulsion, comprising water emulsified in an oil phase, by agitating: water; peroxide catalyst; cobalt salt promoter; tertiary aromatic amine promoter; said cobalt salt promoter and tertiary aromatic amine promoter being present in the oil phase in an amount in the range of about 0.1 to 5% by weight of the oil phase; unsaturated polyester which has a mean molecular weight in the range of 1800 to 100,000, said polyester including reaction product of polycarboxylic acid, at least a portion of which is $\alpha,\beta$ ethylenically unsaturated, and polyhydric alcohol; and ethylenically unsaturated solvent which is copolymerizeable with said polyester; the weight ratio of polyester and solvent to water being in the range of 1:10 to 10:1; and the weight ratio of polyester to solvent being in the range of 10:1 to 1:10.

2. The method of claim 1 wherein the polyester has a mean molecular weight in the range of 2200 to 50,000.

3. The method of claim 1 wherein the polyester has a mean molecular weight in the range of 2800 to 30,000.

4. The method of claim 1 wherein the polyester includes a reaction product of: $\alpha,\beta$ ethylenically unsaturated acid; saturated acid; and polyhydric alcohol.

5. The method of claim 4 wherein the saturated acid is oxalic acid, malonic acid, adipic acid, succinic acid, glutaric acid, sebacic acid, azelaic acid, phthalic acid, isophthalic acid, or terephthalic acid.

6. The method of claim 4 wherein the saturated acid is phthalic acid, isophthalic acid, or terephthalic acid, in an amount up to 5 moles per mole of unsaturated acid which is sufficient to impart appreciable compressive strength, tensile strength, and impact resistance to the thermoset product.

7. The method of claim 6 wherein the saturated acid is isophthalic acid.

8. The method of claim 1 wherein said polyester includes tetrachlorophthalic acid, tetrabromophthalic acid or chlorendic acid.

9. The method of claim 1 wherein the weight ratio of polyester to solvent is in the range of 1:4 to 2:1

10. The method of claim 1 wherein the weight ratio of polyester to solvent is in the range of 1:2 to 2:1.

11. A method for producing shapeable water-in-resin composition which is polymerizeable to a thermoset cellular solid product which comprises forming a pumpable water-in-oil emulsion having water emulsified in an oil phase, said emulsion including: peroxide catalyst; cobalt salt promoter; tertiary aromatic amine promoter; said cobalt salt promoter and tertiary aromatic amine promoter being present in the oil phase in an amount in the range of about 0.1 to 5% by weight of the oil phase; unsaturated polyester which has a mean molecular weight in the range of 1800 to 100,000 and includes reaction product of (A) dicarboxylic acid, at least a portion of which is $\alpha,\beta$-ethylenically unsaturated acid and, as saturated acid, phthalic, isophthalic or terephthalic acid, and (B) dihydric alcohol; and ethylenically unsaturated solvent which is copolymerizeable with said polyester; the weight ratio of polyester and copolymerizeable solvent to water being in the range of 1:10 to 10:1; and the weight ratio of polyester to copolymerizeable solvent being in the range of 10:1 to 1:10.

12. The method of claim 11 wherein the polyester has a mean molecular weight of 2200 to 50,000.

13. The method of claim 11 wherein the polyester has a mean molecular weight of 2800 to 30,000.

14. The method of claim 11 wherein the copolymerizable solvent is styrene.

15. A method for producing shapeable water-in-resin composition which is polymerizable to a thermoset cellular solid product which comprises: forming a pumpable water-in-oil emulsion having water emulsified in an oil phase, by bringing together under vigorous agitation water and an oil phase, said emulsion including peroxide catalyst in an effective amount in the range of 0.001 to 10% by weight of the copolymerizeable solvent referred to below; cobalt salt promoter; tertiary aromatic amine promoter; said cobalt salt promoter and tertiary aromatic amine promoter being present in said oil phase in an amount in the range of about 0.1 to 5% by weight of the oil phase, said amount being sufficient to accelerate catalysis by the peroxide catalyst; unsaturated polyester which has a mean molecular weight in the range of 1800 to 100,000 as calculated from the formula:

$$MW = 2(56,100)/R_n$$

wherein MW is mean molecular weight and $R_n$ is reactivity number, being the sum of the acid value and the hydroxyl value attained in an esterification reaction which forms the polyester, said polyester including the esterification reaction product of (A) dicarboxylic acid, at least a portion of which is α,β-ethylenically unsaturated acid and, as saturated acid, phthalic, isophthalic, or terephthalic acid in an amount up to 5 moles per mole of unsaturated acid, which is sufficient to impart appreciable compressive strength, tensile strength, and impact resistance to the thermoset product; and (B) dihydric alcohol; and styrene as copolymerizeable solvent for said polyester; the weight ratio of polyester and copolymerizeable solvent to water being in the range of 1:4 to 2:1; and the weight ratio of polyester to copolymerizeable solvent being in the range of 1:2 to 2:1.

16. The method of claim 15 wherein the polyester has a mean molecular weight of 2200 to 50,000.

17. A method for producing thermoset cellular solid material which comprises forming a pumpable water-in-oil emulsion, comprising water emulsified in an oil phase, by agitating: water; peroxide catalyst; cobalt salt promoter; tertiary aromatic amine promoter; said cobalt salt promoter and tertiary aromatic amine promoter being present in the oil phase in amount in the range of about 0.1 to 5% by weight of the oil phase; unsaturated polyester which has a mean molecular weight in the range of 1800 to 100,000, said polyester including reaction product of polycarboxylic acid, at least a portion of which is α,β-ethylenically unsaturated, and polyhydric alcohol; and ethylenically unsaturated solvent which is copolymerizeable with said polyester; the weight ratio of polyester and solvent to water being in the range of 1:10 to 10:1; the weight ratio of polyester to copolymerizable solvent being in the range of 10:1 to 1:10; and polymerizing said water-in-oil emulsion for forming the cellular solid material.

18. The method of claim 17 wherein the polyester has a mean molecular weight in the range of 2200 to 50,000.

19. The method of claim 17 wherein the polyester has a mean molecular weight in the range of 2800 to 30,000.

20. The method of claim 17 wherein the polyester includes a reaction product of: α,β-ethylenically unsaturated acid; saturated acid; and polyhydric alcohol.

21. The method of claim 20 wherein the saturated acid is oxalic acid, malonic acid, adipic acid, succinic acid, glutaric acid, sebacic acid, azelaic acid, phthalic acid, isophthalic acid, or terephthalic acid.

22. The method of claim 20 wherein the saturated acid is phthalic acid, isophthalic acid, or terephthalic acid, in an amount up to 5 moles per mole of unsaturated acid which is sufficient to impart appreciable compressive strength, tensile strength, and impact resistance to the thermoset product.

23. The method of claim 22 wherein the saturated acid is isophthalic acid.

24. The method of claim 17 wherein said polyester includes tetrachlorophthalic acid, tetrabromophthalic acid or chlorendic acid.

25. The method of claim 17 wherein the weight ratio of polyester and solvent to water is in the range of 1:4 to 2:1.

26. The method of claim 17 wherein the weight ratio of polyester to solvent is in the range of 1:2 to 2:1.

27. A method for producing thermoset cellular solid material which comprises forming a pumpable water-in-oil emulsion having water emulsified in oil phase, said emulsion including peroxide catalyst; cobalt salt promoter; tertiary aromatic amine promoter; said cobalt salt promoter and tertiary aromatic amine promoter being present in the oil phase in an amount in the range of about 0.1 to 5% by weight of the oil phase; unsaturated polyester which has a molecular weight in the range of 1800 to 100,000 and includes reaction product of (A) polycarboxylic acid, at least a portion of which is α,β-ethylenically unsaturated acid and (B) polyhydric alcohol; and ethylenically unsaturated solvent which is copolymerizable with said polyester; the weight ratio of polyester and solvent to water being in the range of 1:10 to 10:1; and the weight ratio of polyester to solvent being in the range of 10:1 to 1:10; and polymerizing the water-in-oil emulsion without breaking said emulsion for forming the cellular solid material.

28. A method for producing thermoset cellular solid material which comprises forming a pumpable water-in-oil emulsion having water emulsified in an oil phase by adding water while vigorously agitating the oil phase, said emulsion including: peroxide catalyst; cobalt salt promoter; tertiary aromatic amine promoter; said cobalt salt promoter and tertiary aromatic amine promoter being present in the oil phase in an amount in the range of about 0.1 to 5% by weight of the oil phase; unsaturated polyester which has a mean molecular weight in the range of 1800 to 100,000 and includes a reaction product of (A) dicarboxylic acid, at least a portion of which is α,β-ethylenically unsaturated acid and, as saturated acid, phthalic, isophthalic, or terephthalic acid, and (B) dihydric alcohol; and ethylenically unsaturated solvent which is copolymerizable with said polyester; the weight ratio of polyester and copolymerizable solvent to water being in the range of 1:4 to 2:1; and the weight ratio of polyester to copolymerizable solvent being in the range of 1:2 to 2:1; and polymerizing the water-in-oil emulsion without breaking said emulsion for forming the cellular solid material.

29. The method of claim 28 wherein the polyester has a mean molecular weight of 2200 to 50,000.

30. The method of claim 28 wherein the polyester has a mean molecular weight of 2800 to 30,000.

31. The method of claim 28 wherein the copolymerizable solvent in styrene.

32. A method for producing shapeable water-in-oil resin composition which is polymerizable to a thermoset cellular solid product which comprises forming a pumpable water-in-oil emulsion having water emulsified in an oil phase, by bringing together under vigorous agitation water and an oil phase, said emulsion including: water; peroxide catalyst in an effecive amount in the range of 0.001 to 10% by weight of the copolymerizable solvent referred to below; cobalt salt promoter and tertiary aromatic amine promoter being present in said oil phase in an amount in the range of about 0.1 to 5% by weight of the oil phase, said amount being sufficient to accelerate catalysis of the peroxide catalyst; unsaturated polyester which has a mean molecular weight in the range of 1800 to 100,000 as calculated from the formula:

$$MW = 2(56,100)/R_n$$

wherein MW is mean molecular weight and $R_n$ is reactivity number, being the sum of the acid value and the hydroxyl value attained in an esterification reaction which forms the polyester, said polyester including the esterification reaction product of (A) dicarboxylic acid, at least a portion of which is $\alpha,\beta$-ethylenically unsaturated acid and, as saturated acid, phthalic, isophtalic, or terephthalic acid, in an amount up to 5 moles per mole of unsaturated acid, which is sufficient to impart appreciable compressive strength, tensile strength and impact resistance to the thermoset product; and (B) dihydric alcohol; and styrene as copolymerizable solvent for said polyester; the weight ratio of polyester and copolymerizable solvent to water being in the range of 1:4 to 2:1; and the weight ratio of polyester to copolymerizable solvent being in the range of 1:2 to 2:1; and polymerizing the water-in-oil emulsion without breaking said emulsion for forming the cellular solid material.

33. The method of claim 32 wherein the polyester has a mean molecular weight of 2200 to 50,000.

* * * * *